(12) United States Patent
Kim

(10) Patent No.: US 12,344,236 B2
(45) Date of Patent: Jul. 1, 2025

(54) DRIVER ASSISTANCE APPARATUS AND DRIVER ASSISTING METHOD

(71) Applicant: MANDO CORPORATION, Pyeongtaek-si (KR)

(72) Inventor: Deokju Kim, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 0 days.

(21) Appl. No.: 17/116,066

(22) Filed: Dec. 9, 2020

(65) Prior Publication Data

US 2021/0188259 A1 Jun. 24, 2021

(30) Foreign Application Priority Data

Dec. 20, 2019 (KR) ........................ 10-2019-0172319

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 10/20* (2013.01); *B60W 30/0956* (2013.01); *B60W 50/0097* (2013.01); *B60W 50/14* (2013.01); *B60W 2050/146* (2013.01); *B60W 2420/403* (2013.01); *B60W 2420/408* (2024.01); *B60W 2552/53* (2020.02); *B60W 2554/20* (2020.02); *B60W 2554/4026* (2020.02); *B60W 2554/4029* (2020.02)

(58) Field of Classification Search
CPC ...... B60W 30/09; B60W 10/18; B60W 10/20; B60W 30/0956; B60W 50/0097; B60W 50/14

See application file for complete search history.

(56) References Cited

U.S. PATENT DOCUMENTS 9,227,563 B2 * 1/2016 Hamdan ................ G06V 20/58
2019/0113332 A1 * 4/2019 Nishimura ......... H04N 23/6811
(Continued)

FOREIGN PATENT DOCUMENTS

CN 107408340 A 11/2017
CN 108162760 A 6/2018
(Continued)

OTHER PUBLICATIONS

Office Action of the corresponding DE family applications.
KR OA dated Dec. 2, 2024.
CN OA dated Nov. 29, 2024.

*Primary Examiner* — Jelani A Smith
*Assistant Examiner* — Toya Pettiegrew
(74) *Attorney, Agent, or Firm* — Harvest IP Law, LLP

(57) ABSTRACT

An apparatus for assisting driving of a host vehicle includes a camera mounted to the host vehicle and having a field of view outside of the host vehicle, the camera configured to obtain image data; and a controller configured to process the image data, identify at least one object obstructing the host vehicle's driving based on the image data, predict a collision with the at least one object, identify whether the host vehicle is moving forward or backward based on the image data and control a braking device of the host vehicle to brake the host vehicle depending on whether the host vehicle is moving forward or backward.

7 Claims, 10 Drawing Sheets

(51) Int. Cl.
*B60W 10/20* (2006.01)
*B60W 30/095* (2012.01)
*B60W 50/00* (2006.01)
*B60W 50/14* (2020.01)

(56) References Cited

U.S. PATENT DOCUMENTS

| | | | |
|---|---|---|---|
| 2019/0286153 A1* | 9/2019 | Rankawat | G05D 1/0246 |
| 2019/0374151 A1* | 12/2019 | Paudel | B60W 40/09 |
| 2021/0027486 A1* | 1/2021 | Kaino | G06T 7/73 |
| 2021/0107359 A1* | 4/2021 | Takagi | B60K 35/00 |
| 2022/0017093 A1* | 1/2022 | Tamori | B60Q 1/46 |

FOREIGN PATENT DOCUMENTS

| | | | |
|---|---|---|---|
| CN | 108692699 A | | 10/2018 |
| DE | 102019115455 A1 | | 6/2019 |
| DE | 112019000048 T5 | | 1/2020 |
| DE | 112019001659 T5 | | 12/2020 |
| JP | 2008224352 A | | 9/2008 |
| KR | 20190107283 A | | 9/2019 |
| WO | 2019188391 A1 | | 10/2019 |

\* cited by examiner

DRIVER ASSISTANCE APPARATUS AND DRIVER ASSISTING METHOD

CROSS-REFERENCE TO RELATED APPLICATION

This application is based on and claims priority under 35 U.S.C. § 119 to Korean Patent Application No. 10-2019-0172319, filed on Dec. 20, 2019 in the Korean Intellectual Property Office, the disclosure of which is incorporated herein by reference.

BACKGROUND

1. Field

The present disclosure relates to a driver assistance apparatus, and more particularly, to a driver assistance apparatus capable of avoiding a collision with an object.

2. Description of the Related Art

Generally, a vehicle refers to a movement device or transportation device, designed to drive on a road or railway using fossil fuel, electric power, and the like as a power source. The vehicle may move to various positions mainly using one or more wheels installed on the vehicle body. Such a vehicle may include a three-wheeled or four-wheeled vehicle, a two-wheeled vehicle, such as a motorcycle, a construction machine, a bicycle, and a train traveling on a railway arranged on a track.

Vehicles are the most common means of transportation in modern society, and the number of people using them is increasing. Due to the development of vehicle technology, long-distance movement is easy and life is easier. However, in places with a high population density, road traffic conditions deteriorate and traffic congestion often occurs.

Recently, there have been active studies on a vehicle equipped with an advanced driver assist system (ADAS), which actively provides information about the state of a vehicle, the state of a driver, and the surrounding environment to reduce the burden on the driver while enhancing the convenience of the driver.

Examples of advanced driver assistance apparatus mounted on vehicles include Forward Collision Avoidance (FCA), Autonomous Emergency Brake (AEB), and Driver Attention Warning (DAW). Such a system is a system for determining the risk of collision with an object in a driving situation of a vehicle, and providing a collision avoidance and warning through emergency braking in a crash situation.

The driver assistance apparatus relies on information received from the engine, transmission, braking device and steering device included in the vehicle in connection with the driving of the vehicle. However, when erroneous information is received from the engine, transmission, braking device and steering device, the driver assistance apparatus may malfunction.

SUMMARY

For the above reasons, an aspect of the present disclosure is to provide a driver assistance apparatus and a driver assisting method capable of identifying forward movement or backward movement of a vehicle based on image data.

Therefore, it is an aspect of the present disclosure to provide an apparatus for assisting driving of a host vehicle including: a camera mounted to the host vehicle and having a field of view outside of the host vehicle, the camera configured to obtain image data; and a controller configured to process the image data, identify at least one object obstructing the host vehicle's driving based on the image data, predict a collision with the at least one object, identify whether the host vehicle is moving forward or backward based on the image data and control a braking device of the host vehicle to brake the host vehicle depending on whether the host vehicle is moving forward or backward.

The controller may be configured to control the braking device of the host vehicle to brake the host vehicle in response to the forward movement of the host vehicle.

The controller may be configured to control at least one of a display, an audio and a steering wheel of the host vehicle to warn of a collision of the host vehicle in response to the backward movement of the host vehicle.

The controller may be configured to identify a stationary object within an image frame by the image data, and identify whether the host vehicle is moving forward or backward based on the movement of the stationary object over time.

The controller may be configured to identify at least one of a lane marker and a sign within an image frame by the image data and identify whether the host vehicle is moving forward or backward based on the movement over time of at least one of the lane marker and the sign.

The controller may be configured to identify that the host vehicle is moving forward in response to the stationary object moving in a direction from the center of the image frame toward the edge.

The controller may be configured to identify that the host vehicle is moving backward in response to the stationary object moving in a direction from the edge of the image frame toward the center.

It is another aspect of the present disclosure to provide a method for assisting driving of a host vehicle including: processing an image data obtained by a camera mounted to the host vehicle and having a field of view outside of the host vehicle, having a front field of view of the vehicle; identifying at least one object obstructing the host vehicle's driving based on the image data; predicting a collision with the at least one object; identifying whether the host vehicle is moving forward or backward based on the image data; and controlling a braking device of the host vehicle to brake the host vehicle depending on whether the host vehicle is moving forward or backward.

The controlling a braking device of the host vehicle to brake the host vehicle may include: controlling the braking device of the host vehicle to brake the host vehicle in response to the forward movement of the host vehicle.

The driver assistance method may further include: controlling at least one of a display, an audio and a steering wheel of the host vehicle to warn of a collision of the host vehicle in response to the backward movement of the host vehicle.

The identifying whether the host vehicle is moving forward or backward may include: identifying a stationary object within an image frame based on the image data; and identifying whether the host vehicle is moving forward or backward based on the movement of the stationary object over time.

The identifying a stationary object within an image frame by the image data may include: identifying at least one of a lane marker and a sign within an image frame by the image data.

The identifying whether the host vehicle is moving forward or backward based on the movement of the stationary object over time may include: identifying that the host vehicle is moving forward in response to the stationary object moving in a direction from the center of the image frame toward the edge.

The identifying whether the host vehicle is moving forward or backward based on the movement of the stationary object over time may include: identifying that the host vehicle is moving backward in response to the stationary object moving in a direction from the edge of the image frame toward the center.

The predicting a collision with the at least one object may include: obtaining detection data by sensor installed in the host vehicle, having a detection field of view of at least one of the front and side of the host vehicle in the group including a radar sensor and a lidar sensor; and predicting a collision with the at least one object based on the detection data.

It is another aspect of the present disclosure to provide an apparatus for assisting driving of a host vehicle including: an image sensor mounted to the host vehicle and having a field of view outside of the host vehicle, the image sensor configured to obtain image data; a radar sensor mounted to the host vehicle and having a detection field of view of at least one of the front and side of the host vehicle and configured to obtain detection data; and a controller configured to process the image data and the detection data, identify at least one object obstructing the host vehicle's driving based on the image data, predict a collision with the at least one object based on the detection data, identify whether the host vehicle is moving forward or backward based on the image data and control a braking device of the host vehicle to brake the host vehicle depending on whether the host vehicle is moving forward or backward.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
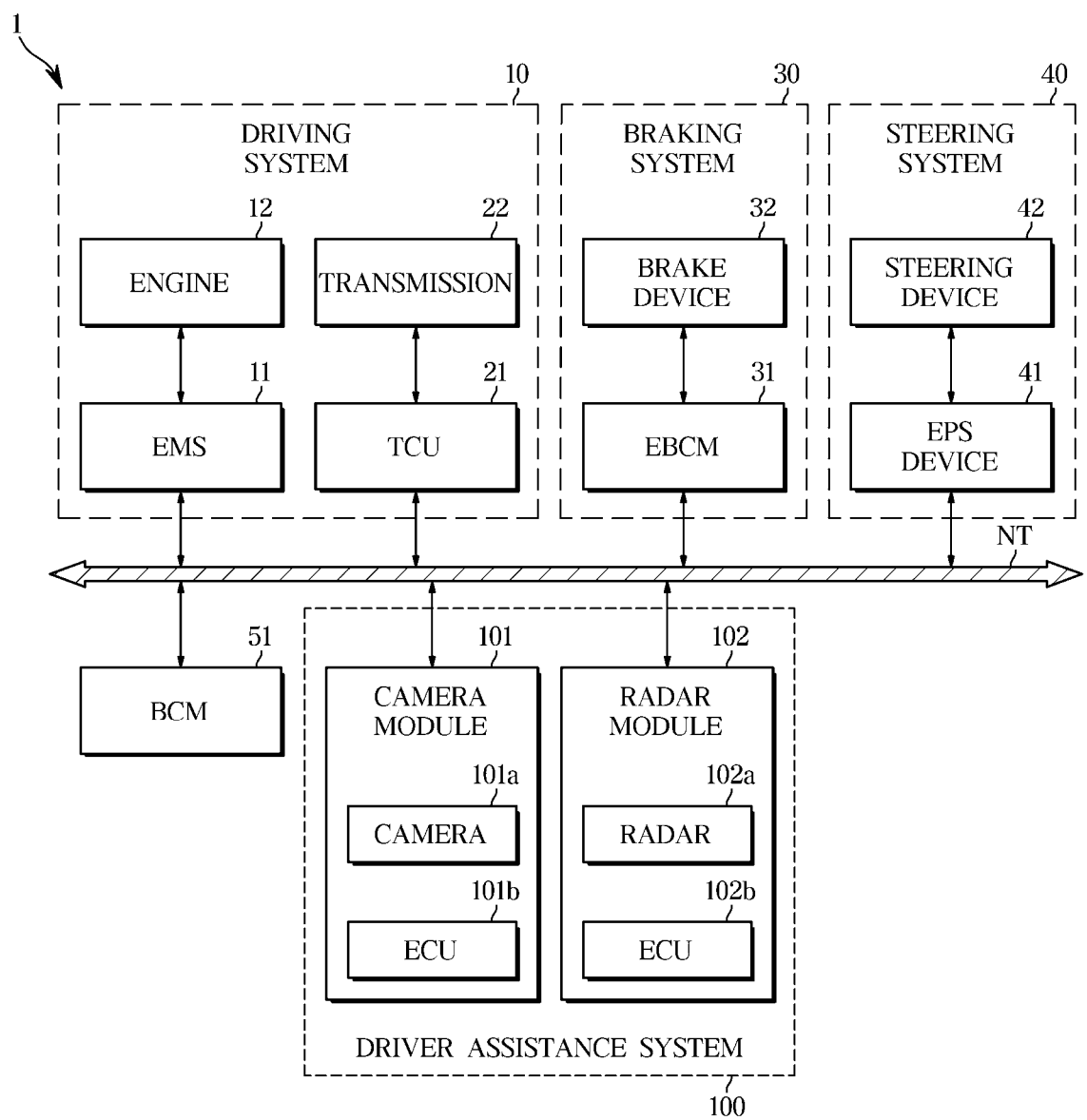
FIG. 1 is a block diagram illustrating a configuration of a vehicle according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, the principles and embodiments of the disclosure will be described with reference to the accompanying drawings.

FIG. 1 is a block diagram illustrating a configuration of a vehicle according to an embodiment.

As shown in FIG. 1, the vehicle 1 includes a driving system 10, a braking system 30 and a steering system 40.

The driving system 10 moves the vehicle 1, and includes an engine management system (EMS) 11, an engine 12, a transmission control unit (TCU) 21, and a transmission 22.

The engine 12 may include a cylinder and a piston, and generate power required for the vehicle 1 to drive. The transmission 22 may include a plurality of gears, and transmit the power generated by the engine 12 to wheels.

The EMS 11 may control the engine 12 in response to an acceleration intention of the driver through an accelerator pedal or a request of the driver assistance apparatus 100. For example, the EMS 11 may control the torque of the engine 12.

The TCU 21 may control the transmission 22 in response to a shift command of the driver through a shift lever and/or a driving speed of the vehicle 1. For example, the TCU 21 may adjust the gear ratio of the engine 12 to the wheels.

The braking system 30 stops the vehicle 1 and may include an Electronic Brake Control Module (EBCM) 31 and a braking device 32.

The braking device 32 may decelerate the vehicle 1 or stop the vehicle 1 through friction with the wheel.

The EBCM 31 may control the braking device 32 in response to a braking intention of the driver through a braking pedal and/or a slip of the wheels. For example, the EBCM 31 may control the braking device 32 to temporarily release the braking of the wheels in response to a slip of the wheels sensed at a time of braking the vehicle 1 (anti-lock braking systems: ABS). The EBCM 31 may control the braking device 32 to selectively release braking of the wheels in response to over-steering and/or under-steering sensed at a time of steering the vehicle 1 (electronic stability control: ESC). In addition, the EBCM 31 may control the braking device 32 to temporarily brake the wheels in response to a slip of the wheels sensed at a time of driving the vehicle 1 (traction control system: TCS).

In addition, the EBCM 31 may control the braking device 32 in response to a request from the driver assistance apparatus 100. For example, the EBCM 31 may receive a deceleration request including a deceleration rate from the driver assistance apparatus 100 and control the braking device 32 so that the vehicle 1 decelerates depending on the requested deceleration rate.

The steering system 40 may include an Electronic Power Steering Control Module (EPS) 41 and a steering device 40.

The steering device 42 may change the driving direction of the vehicle 1.

The EPS 41 may assist the operation of the steering device 42 in response to a steering intention of the driver through the steering wheel such that the driver may easily operate the steering wheel. For example, the EPS 41 may assist the operation of the steering device 42 such that the steering force is reduced during low-speed driving or parking and the steering force is increased during high-speed driving.

In addition, the EPS 41 may control the steering apparatus 42 in response to a request from the driver assistance apparatus 100. For example, the electronic steering control module 41 may receive a steering request including a steering torque from the driver assistance apparatus 100, and control the steering device 42 to steer the vehicle 1 depending on the requested steering torque.

The vehicle 1 further includes a body control module (BCM) 51 and a driver assistance apparatus 100 for driver safety and convenience.

The BCM 51 may control the operation of machine parts that provide convenience to the driver or ensure the safety of the driver. For example, the BCM 51 may control a head lamp, a wiper, a cluster, a multifunction switch, a direction indicator lamp, and the like.

The driver assistance apparatus 100 may assist the driver in manipulating (driving, braking, and steering) the vehicle 1. For example, the driver assistance apparatus 100 may sense a surrounding environment of the vehicle 1 (e.g., another vehicle, a pedestrian, a cyclist, a lane, a road sign, and the like), and control driving and/or braking and/or steering of the vehicle 1 in response to the sensed environment. The driver assistance apparatus 100 may provide the driver with various functions. For example, the DAS 100 may include a lane departure warning (LDW), a lane keeping assist (LKA), a high beam assist (HBA), an automatic emergency braking (AEB), a traffic sign recognition (TSR), a smart cruise control (SCC), a blind spot detection (BSD), and the like.

The driver assistance apparatus 100 includes a camera module 101 that acquires image data of the surrounding of the vehicle 1 and a radar module 102 that acquires object data of the surrounding of the vehicle 1. The camera module 101 may include a camera 101a and an electronic control unit (ECU) 101b, and photograph at least one of the front or the lateral side of the vehicle 1 and recognize another vehicle, a pedestrian, a cyclist, a lane, a road sign, and the like. The radar module 102 may include a radar 102a and an ECU 102b, and acquire a relative position, a relative velocity, and the like of an object of the surrounding of the vehicle 1 (e.g., another vehicle, a pedestrian, a cyclists, and the like).

The driver assistance apparatus 100 is not limited to the one shown in FIG. 1, and may further include a LiDAR that scans around the vehicle 1 and detects an object.

The above described electronic components may communicate with each other through vehicle communication network NT. For example, the machine parts may transmit data through Ethernet, media oriented systems transport (MOST), Flexray, controller area network (CAN), local interconnect network (LIN), and the like. For example, the driver assistance apparatus 100 may transmit a driving signal, a braking signal, and a steering signal to the EMS 11, the TCU 21, the EBCM 31, and the EPS 41, respectively.

Figure 2:
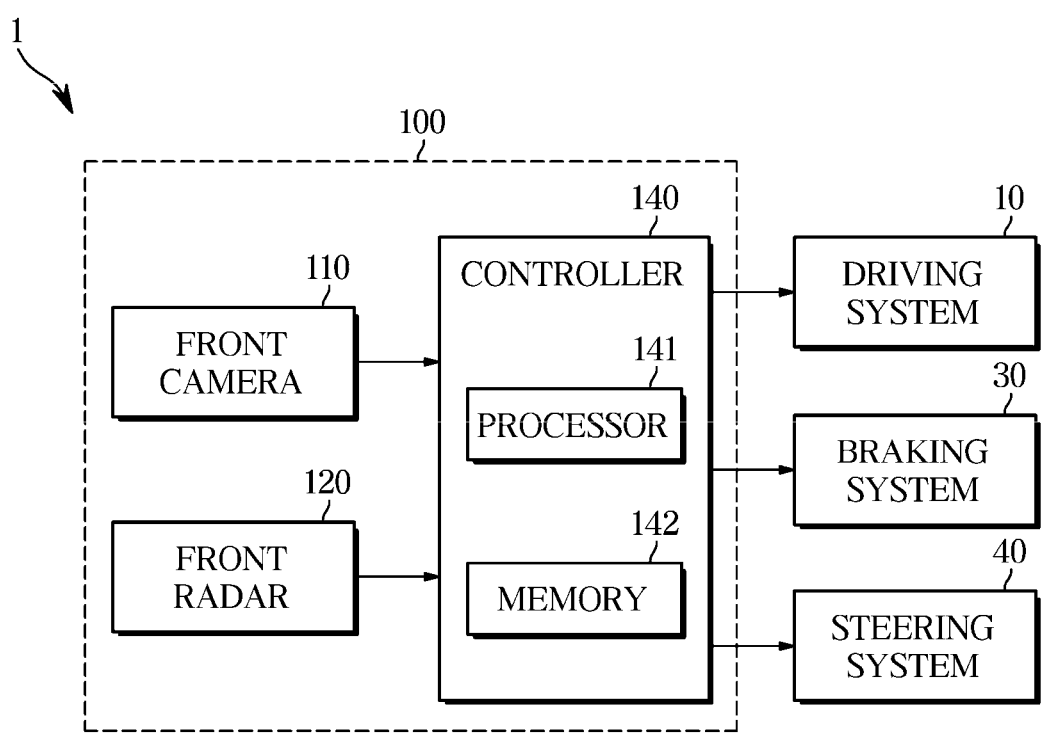
FIG. 2 is a block diagram illustrating a configuration of a driver assistance apparatus according to an embodiment.
Figure 3:
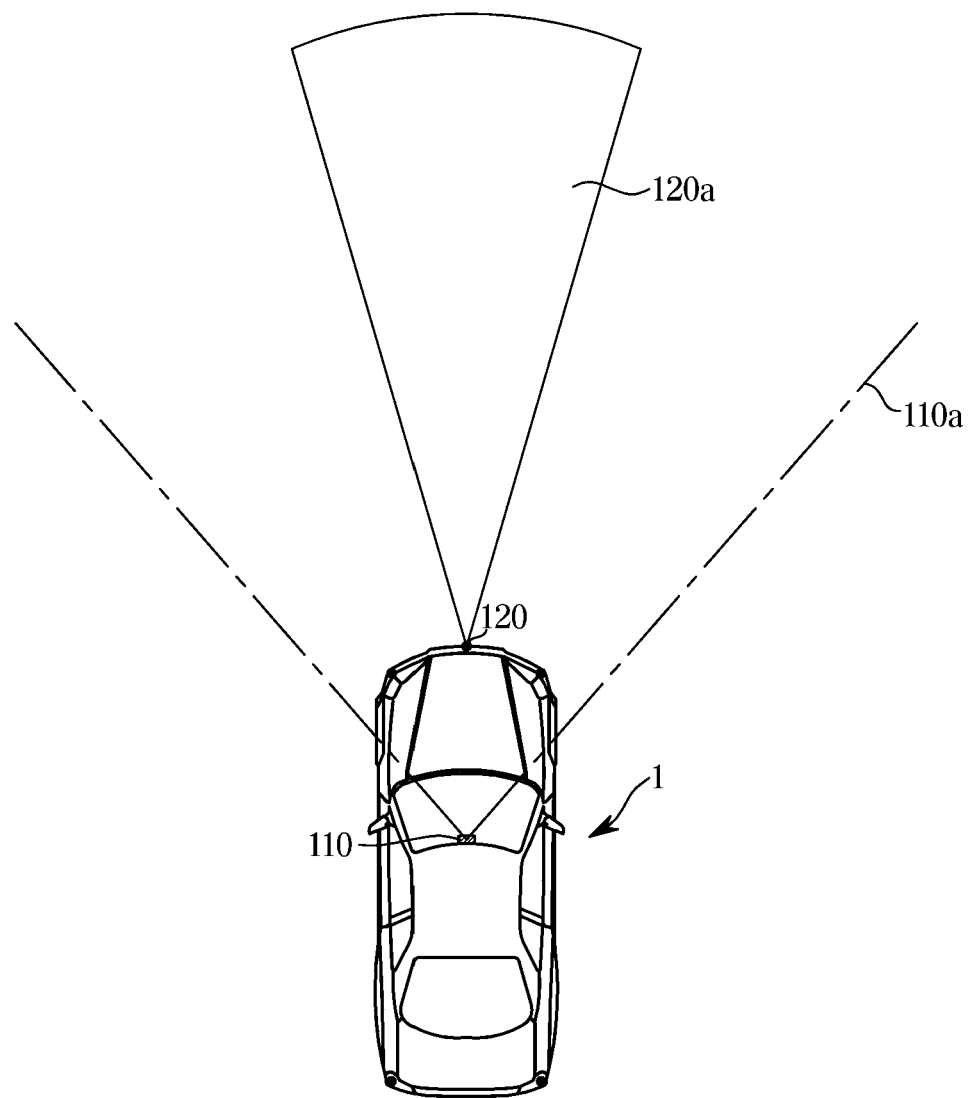
FIG. 3 is a diagram illustrating a field of view of a camera and a radar included in a driver assistance apparatus according to an embodiment.

FIG. 2 is a block diagram illustrating a configuration of a driver assistance apparatus according to an embodiment. FIG. 3 is a diagram illustrating a field of view of a camera and a radar included in a driver assistance apparatus according to an embodiment.

As shown in FIG. 2, the vehicle 1 may include a driving system 10, a braking system 30, a steering system 40, and a driver assistance apparatus 100.

The driving system 10, the braking system 30, and the steering system 40 may be the same as the driving system 10, the braking system 30, and the steering system 40 shown in FIG. 1.

The driver assistance apparatus 100 may include a front camera 110, a front radar 120, and a controller 140.

The front camera 110 may have a field of view 110a facing the front of the vehicle 1 as shown in FIG. 3. The front camera 110 may be installed, for example, on the front windshield of the vehicle 1.

The front camera 110 may photograph the front of the vehicle 1 and acquire image data of the front of the vehicle 1. The image data of the front of the vehicle 1 may include position information of another vehicle, a pedestrian, a cyclist, or a lane existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to the controller 140. For example, the front camera 110 may be connected to the controller 140 through a vehicle communication network NT, may be connected to the controller 140 through a hard wire, or may be connected to the controller 140 through a printed circuit board (PCB).

The front camera 110 may transmit image data in front of the vehicle 1 to the controller 140.

The front radar 120 may have a field of sensing 120a facing the front of the vehicle 1 as shown in FIG. 3. The front radar 120 may be installed, for example, on a grille or bumper of the vehicle 1.

The front radar 120 may include a transmission antenna (or a transmission antenna array) that radiates transmission radio waves forward of the vehicle 1 and a reception antenna (or a reception antenna array) that receives reflected radio waves reflected from an object. The front radar 120 may acquire front radar data from the transmission radio waves transmitted by the transmission antenna and the reflected radio waves received by the reception antenna. Front radar data may include distance information and velocity information regarding another vehicle, a pedestrian, or a cyclist existing in front of the vehicle 1. The front radar 120 may calculate the relative distance to the object on the basis of the phase difference (or time difference) between the transmission radio waves and the reflected radio waves, and calculate the relative velocity of the object on the basis of the frequency difference between the transmission radio waves and the reflected radio waves.

The front radar 120 may be connected to the controller 140 through a vehicle communication network NT, a hard wire, or a printed circuit board. The front radar 120 may transmit the front radar data to the controller 140.

The controller 140 may include the ECU (101b in FIG. 1) of the camera module (101 in FIG. 1) and/or the ECU (102b in FIG. 1) of the radar module (102 in FIG. 1), and/or an integrated ECU.

The controller 140 may be electrically connected to the front camera 110 and the front radar 120. In addition, the controller 140 may be connected to the driving system 10, the braking system 30, and the steering system 40 through a vehicle communication network NT.

The controller 140 includes a processor 141 and a memory 142.

The processor 141 may process the front image data of the front camera 110 and the detection data of the front radar 120, and generate a driving signal, a braking signal and a steering signal for controlling the driving system 10, the braking system 32 and the steering system 42. For example, the processor 141 may include an image signal processor for processing front image data of the front camera 110 and/or a digital signal processor for processing radar data of the radars 120, 130 and/or a micro control unit (MCU) for generating a driving signal, a braking signal and a steering signal.

The processor 141 may sense objects (e.g., another vehicle, a pedestrian, a cyclist, and the like) front of the vehicle 1 on the basis of the front image data of the front camera 110 and the detection data of the front radar 120.

The processor 141 may obtain a position (direction) and classification (eg, whether the object is another vehicle, a pedestrian, or a cyclist) of objects in front of the vehicle 1 based on the image data of the front camera 110. The processor 141 may obtain the positions (distances and directions) and relative velocity of objects in front of the vehicle 1 based on the detection data of the front radar 120. In addition, the processor 141 may match objects detected by the image data to objects detected by the detection data, and obtain classification, relative positions, and relative velocity of objects in front of the vehicle 1 based on the matching result.

The processor 141 may generate a driving signal, a braking signal, and a steering signal based on the relative positions and relative velocity of the front objects. For example, the processor 141 may transmit a driving signal to the driving system 10 so that the distance to the preceding vehicle (or the time until reaching the position of the preceding vehicle) becomes a distance set by the driver. In addition, the processor 141 calculates a time to collision (TTC) or a distance to collision (DTC) between the vehicle 1 and the front object on the basis of the position (distance) and the relative velocity of the front object, and warns the driver of a collision or transmits a braking signal to the braking system 32 on the basis of a result of comparing the TTC with a reference value. Further, the processor 141 may transmit a steering signal to the steering system 40 in order to avoid a collision with the front object when it is determined that the collision with the front object is based on the time to the collision or the distance to the collision.

The processor 141 may select a target having a risk of collision among front objects based on the image data of the front camera 110. For example, the processor 141 may select another vehicle driving in the same lane as the vehicle 1 as a target.

The processor 141 may identify movement of an object other than the target (hereinafter referred to as 'another object') based on the image data of the front camera 110, and may identify whether the vehicle 1 is moving forward or backward based on the movement of the another object. For example, the processor 141 may identify whether the vehicle 1 is moving forward or backward based on the movement of a fixed object (eg, a lane or a sign).

The processor 141 may output a braking signal and/or a steering signal for avoiding a collision with a target based on the vehicle 1 moving forward. Also, the processor 141 may output a driving signal for avoiding a collision with a target based on the vehicle 1 moving backward.

The memory 142 stores programs and/or data for processing image data by the processor 141, programs and/or data for processing radar data by the processor 141, and programs and/or data for generating a driving signal and/or a braking signal and/or a steering signal by the processor 141.

The memory 142 may temporarily store the image data received from the front camera 110 and/or the radar data received from the radars 120 and 130, and may temporarily store a result of processing the image data and/or the detection data of the processor 141.

The memory 142 may include a volatile memory, such as an S-RAM, a D-RAM, and the like, and a non-volatile memory, such as a flash memory, a read only memory (ROM), an erasable programmable read only memory (EPROM), and the like.

As such, the controller 140 may transmit a braking signal to the braking system 30 on the basis of whether a collision with the front object is predicted to occur. In addition, the controller 140 may transmit a steering signal to the steering system 40 to avoid a collision with a front object.

In addition, when a collision with a target is predicted, the controller 140 may identify whether the vehicle 1 is moving straight forward or backward based on the movement of another object. The controller 140 may output a braking signal and/or a steering signal to avoid a collision with a target when the vehicle 1 is moving straight, and may not output a braking signal and/or a steering signal when the vehicle 1 is moving backward.

The driver assistance apparatus 100 is not limited to the one illustrated in FIG. 2, and may further include a LiDAR that scans around the vehicle 1 and detects an object.

Figure 4:
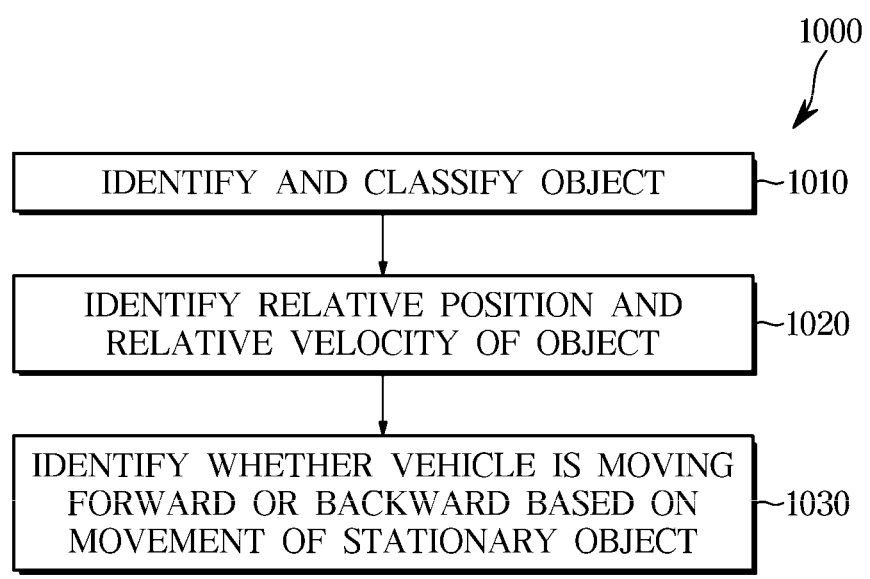
FIG. 4 is a diagram illustrating a method of determining driving of a driver assistance apparatus according to an exemplary embodiment.
Figure 5:
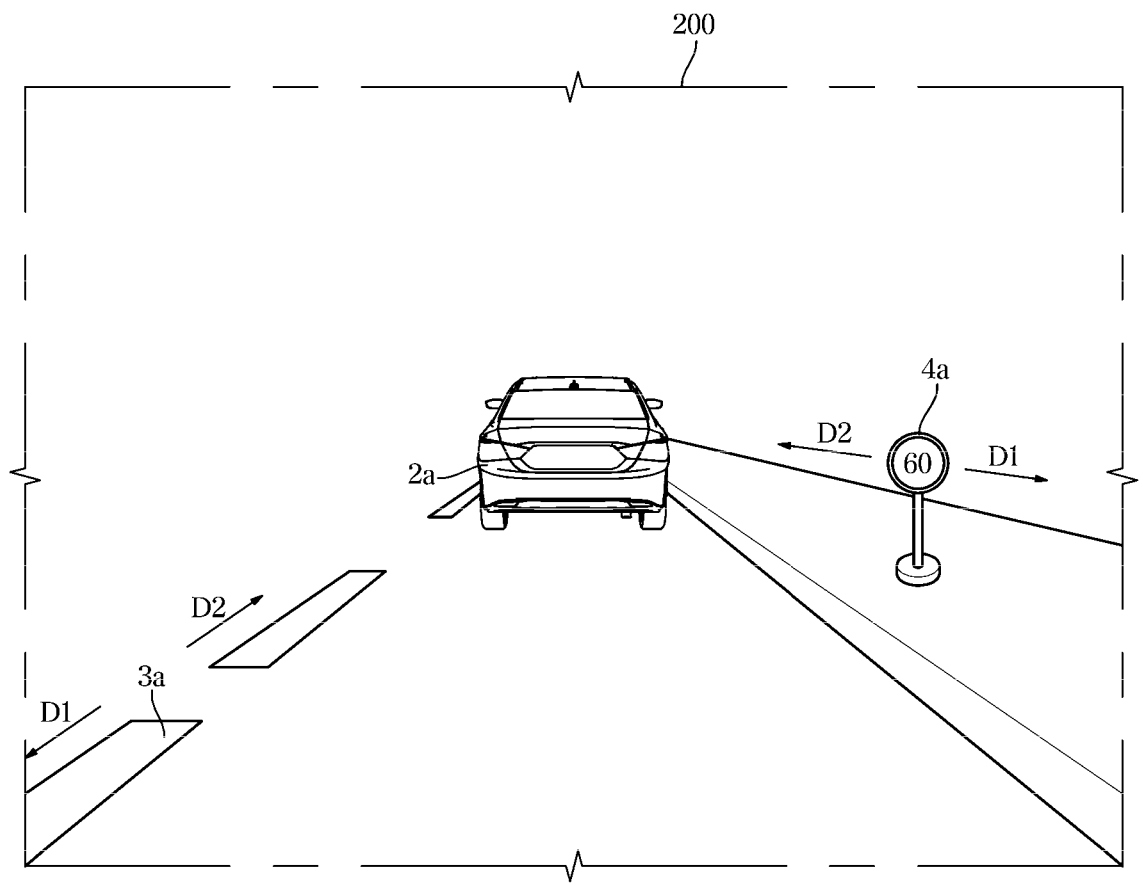
FIG. 5 is a diagram illustrating an image captured by a camera included in a driver assistance apparatus according to an embodiment.

FIG. 4 is a diagram illustrating a method of determining driving of a driver assistance apparatus according to an exemplary embodiment. FIG. 5 is a diagram illustrating an image captured by a camera included in a driver assistance apparatus according to an embodiment.

A method 1000 of determining driving of a driver assistance apparatus will be described with reference to FIGS. 4 and 5.

The driver assistance apparatus 100 identifies and classifies objects around the vehicle 1 (1010).

While the vehicle 1 is driving or stopped, the front camera 110 of the driver assistance apparatus 100 may acquire image data in front of and/or around the vehicle 1. The controller 140 of the driver assistance apparatus 100 may acquire image data from the front camera 110. The controller 140 may identify and classify objects located in front of and/or around the vehicle 1 based on image data. For example, the controller 140 may identify objects including lane markers, signs, another vehicles, pedestrians, bicycles, road boundaries, animals, traffic lights located in front and/or around the vehicle 1. In addition, the controller 140 may classify the identified object into lane markers, signs, another vehicles, pedestrians, bicycles, road boundaries, animals, traffic lights, and the like.

While the vehicle 1 is driving or stopped, the front radar 120 of the driver assistance apparatus 100 may acquire detection data in front of and/or around the vehicle 1. The controller 140 may acquire detection data from the front radar 120. The controller 140 may identify objects located in front of and/or around the vehicle 1 based on detection data.

The controller 140 may identify objects located in front of and/or around the vehicle 1 depending only on the image data of the front camera 110, or may identify objects located in front of and/or around the vehicle 1 depending only on detection data of the front radar 120.

In addition, the controller 140 may identify objects located in front of and/or around the vehicle 1 based on image data of the front camera 110 and detection data of the front radar 120. For example, the controller 140 may identify a common object between objects identified based on the image data of the front camera 110 and the objects identified based on the detection data of the front radar 120.

The driver assistance apparatus 100 may identify the relative position and relative velocity of the surrounding objects of the vehicle 1 (1020).

The controller 140 may identify the relative positions of objects located in front of and/or around the vehicle 1 based on the image data, and may identify relative velocities of objects located in front of and/or around the vehicle 1 based on a plurality of consecutive image data. For example, the controller 140 may identify relative positions of objects based on the position of the object in the image by image data (coordinates of the pixels occupied by the object in the image frame) and the size of the object (the number of pixels occupied by the object in the image frame). In addition, the controller 140 may identify the lateral relative velocity of the objects based on a change in the position of the object in the image by a plurality of consecutive image data (coordinates of the pixel occupied by the object in the image frame), and may identify the longitudinal relative velocity of the objects based on a change in the size of the object (the number of pixels occupied by the object in the image frame).

In addition, the controller 140 may identify relative positions and relative velocities of objects located in front of and/or around the vehicle 1 based on detection data. For example, the controller 140 may identify the relative positions of objects located in front of and/or around the vehicle 1 based on the time until the radio wave reflected from the object is received and the angle at which the radio wave is received. In addition, the controller 140 may identify relative velocities of objects located in front of and/or around the vehicle 1 based on a frequency change (Doppler effect) of radio waves reflected from the object.

In addition, the controller 140, based on the image data of the front camera 110 and the detection data of the front radar 120, may identify the relative position and relative velocity of the object located in front of and/or around the vehicle 1. For example, the controller 140 may determine the lateral relative position and the lateral relative velocity of the object based on the image data of the front camera 110 and may determine a longitudinal relative position and a longitudinal relative velocity of the object based on detection data of the front radar 120. Here, the lateral direction indicates a direction perpendicular to the driving direction of the vehicle 1, and the vertical direction may indicate a direction parallel to the driving direction of the vehicle 1.

The driver assistance apparatus 100 identifies whether the vehicle 1 is moving forward or backward based on the movement of the stationary object (1030).

In general, the driver assistance apparatus 100 may receive driving state information including forward and backward movement from the driving system 20. For example, the driver assistance apparatus 100 may receive information on the position of the shift lever from the transmission control unit 21 or information on the operation of the transmission 22 (hereinafter referred to as 'shift information'). However, due to a malfunction of the transmission control unit 21, the driver assistance apparatus 100 may receive incorrect shift information from the transmission control unit 21.

In order to prevent the driver assistance apparatus 100 from performing an erroneous operation due to receiving incorrect shift information from the transmission control unit 21, the controller 140 may determine a shift state (eg, forward movement or backward movement of the vehicle) based on the image data acquired by the front camera 110.

In order to determine the shift state of the vehicle 1 (eg, forward movement or backward movement of the vehicle), the controller 140 may identify an object with a fixed position such as a lane marker or sign on the road. For example, the controller 140 may detect a lane marker having a broken line shape from image data using an edge detection algorithm or the like, and detect a sign from the image data using a machine learning technique.

The controller 140 may identify whether the vehicle 1 is moving forward or backward based on the movement of the stationary object within the image frame.

For example, the controller 140 may receive image data of the image frame 200 as shown in FIG. 5 from the front camera 110. The image frame 200 may include a preceding vehicle image 2a, a lane marker image 3a, and a sign image 4a.

The controller 140 may identify the preceding vehicle image 2a, the lane marker image 3a, and the sign image 4a as objects from the image frame 200, and may identify the relative position and relative velocity of the preceding vehicle image 2a, the lane marker image 3a, and the sign image 4a, respectively.

Based on the image frame 200, the controller 140 may determine that the preceding vehicle is a moving object, and determine that the lane marker and the display panel are stationary objects. In addition, the controller 140 may identify positions (or pixel coordinates) of the lane marker image 3a and the sign image 4a in the frame. The controller 140 may identify positions (or pixel coordinates) of the lane marker image and the sign image in the next image frame in time of the image frame 200 illustrated in FIG. 5. In addition, the controller 140 may identify a change in the position (or pixel coordinate) of the lane marker image 3a and the sign image 4a in the frame based on the comparison result of the image frame 200 and the next image frame.

The controller 140 may identify whether the vehicle 1 is moving forward or backward based on a change in a position (or pixel coordinate) within a frame of the lane marker image 3a and the sign image 4a.

For example, when the lane marker image 3a and the sign image 4a move in the first direction D1 in which the lane marker image 3a and the sign image 4a face the edge of the image frame 200 from the center of the image frame 200, the controller 140 may identify that the vehicle 1 is moving forward. In other words, when the sign image 4a located in the right half of the image frame 200 in FIG. 5 moves further to the right, the controller 140 may determine that the sign is moving away from the vehicle 1 and may also identify that the vehicle 1 is moving forward. In addition, when the lane marker image 3a located in the lower left of the image frame 200 in FIG. 5 moves further to the lower left, the controller 140 may determine that the lane marker is moving away from the vehicle 1 and may also identify that the vehicle 1 is moving forward.

In addition, when the size of the sign image 4a (the number of pixels occupied by the sign image) increases, the controller 140 may identify that the vehicle 1 is moving forward.

As another example, when the lane marker image 3a and the sign image 4a move in the second direction D2 in which the lane marker image 3a and the sign image 4a face the center of the image frame 200 from the edge of the image frame 200, the controller 140 may identify that the vehicle 1 is moving backward. In other words, when the sign image 4a located in the right half of the image frame 200 in FIG. 5 moves to the left, the controller 140 may determine that the sign is close to the vehicle 1 and may also identify that the vehicle 1 is moving backward. In addition, when the lane marker image 3a located in the lower left of the image frame 200 in FIG. 5 moves to the lower right, the controller 140 may determine that the lane marker is close to the vehicle 1 and may also identify that the vehicle 1 is moving backward.

In addition, when the size of the sign image 4a (the number of pixels occupied by the sign image) decreases, the controller 140 may identify that the vehicle 1 is moving backward.

As described above, the driver assistance apparatus 100 may identify whether the vehicle 1 is moving forward or backward based on image data acquired by the front camera 110.

Thereby, in spite of the malfunction of the transmission control device 21, the driver assistance apparatus 100 may identify whether the vehicle 1 is moving forward or backward.

Figure 6:
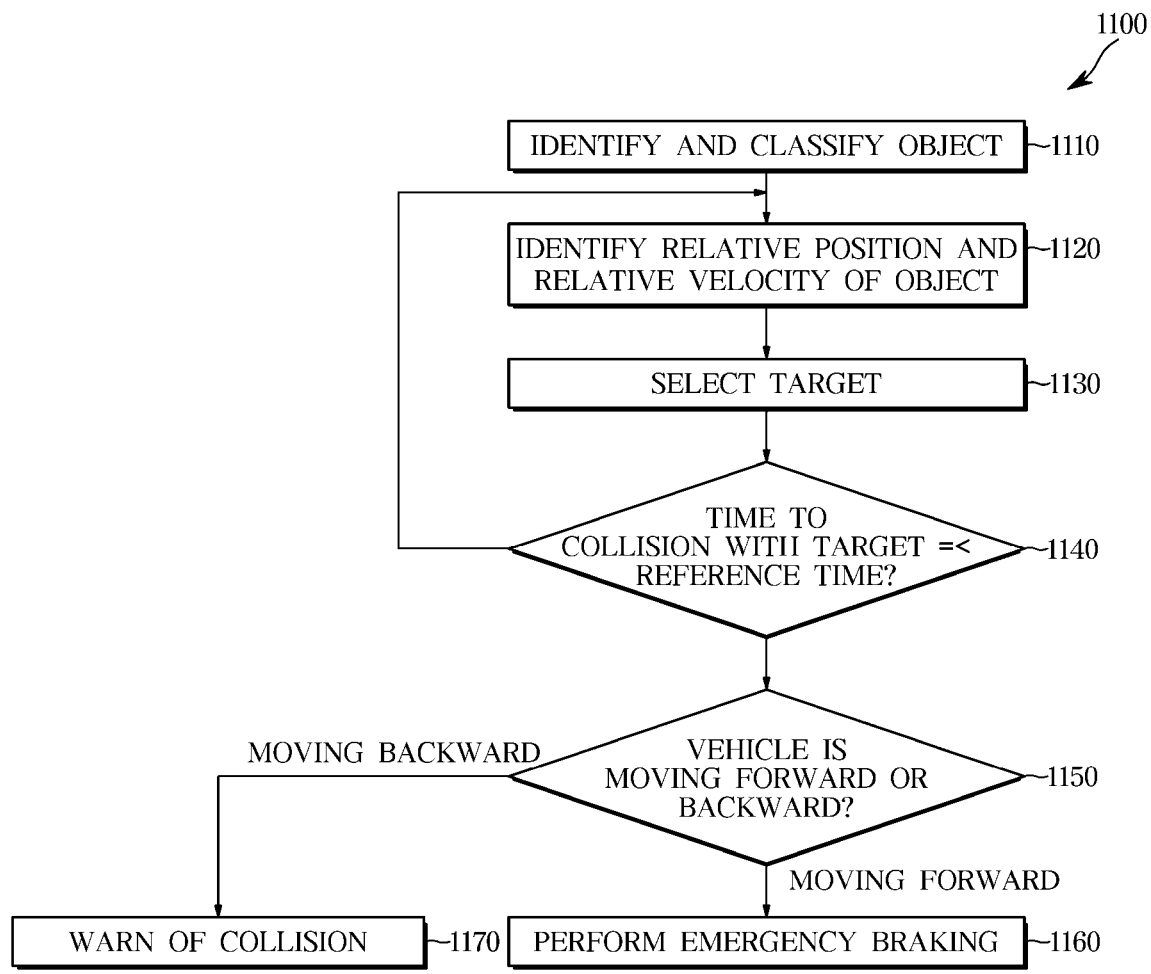
FIG. 6 is a diagram illustrating an emergency braking method of a driver assistance apparatus according to an embodiment.
Figure 7:
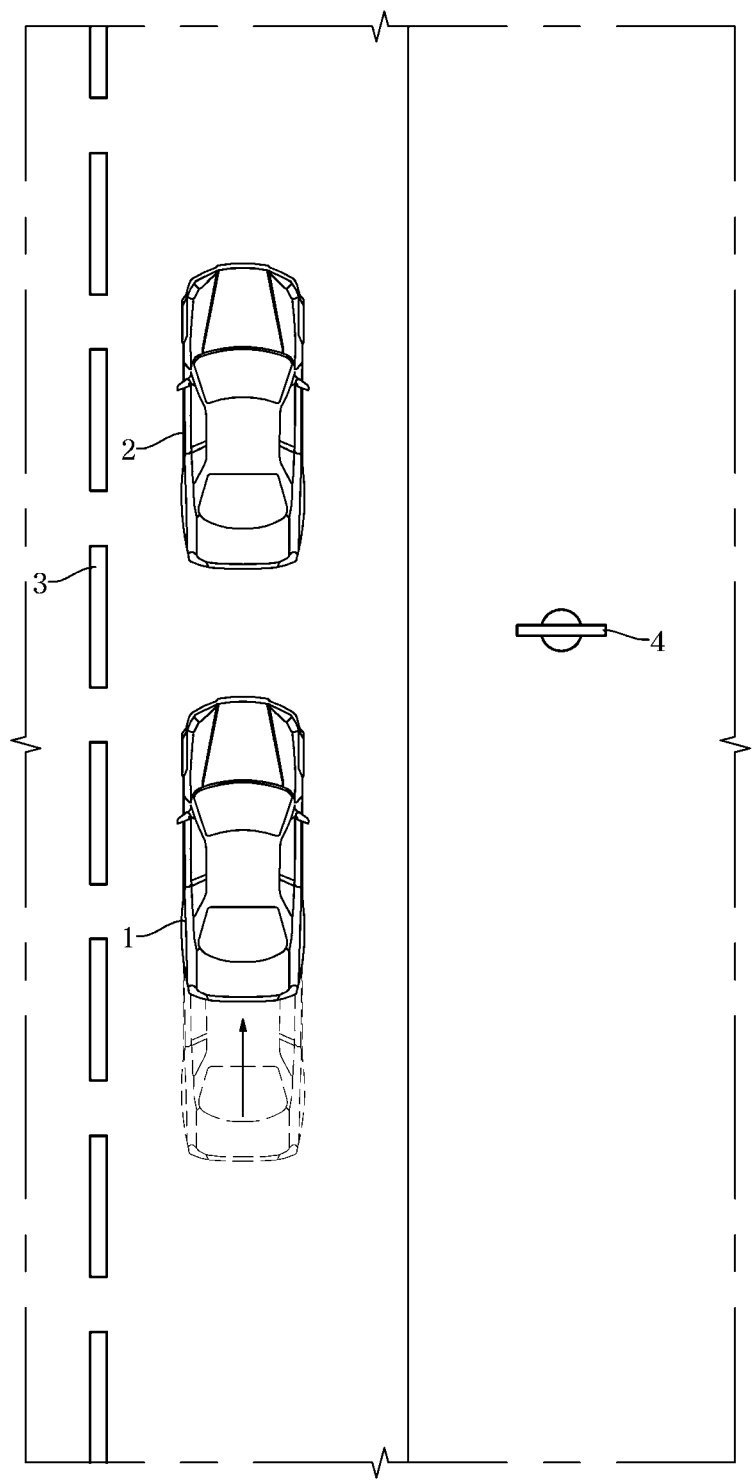
FIG. 7 is a diagram illustrating a vehicle driving forward according to an embodiment.
Figure 8:
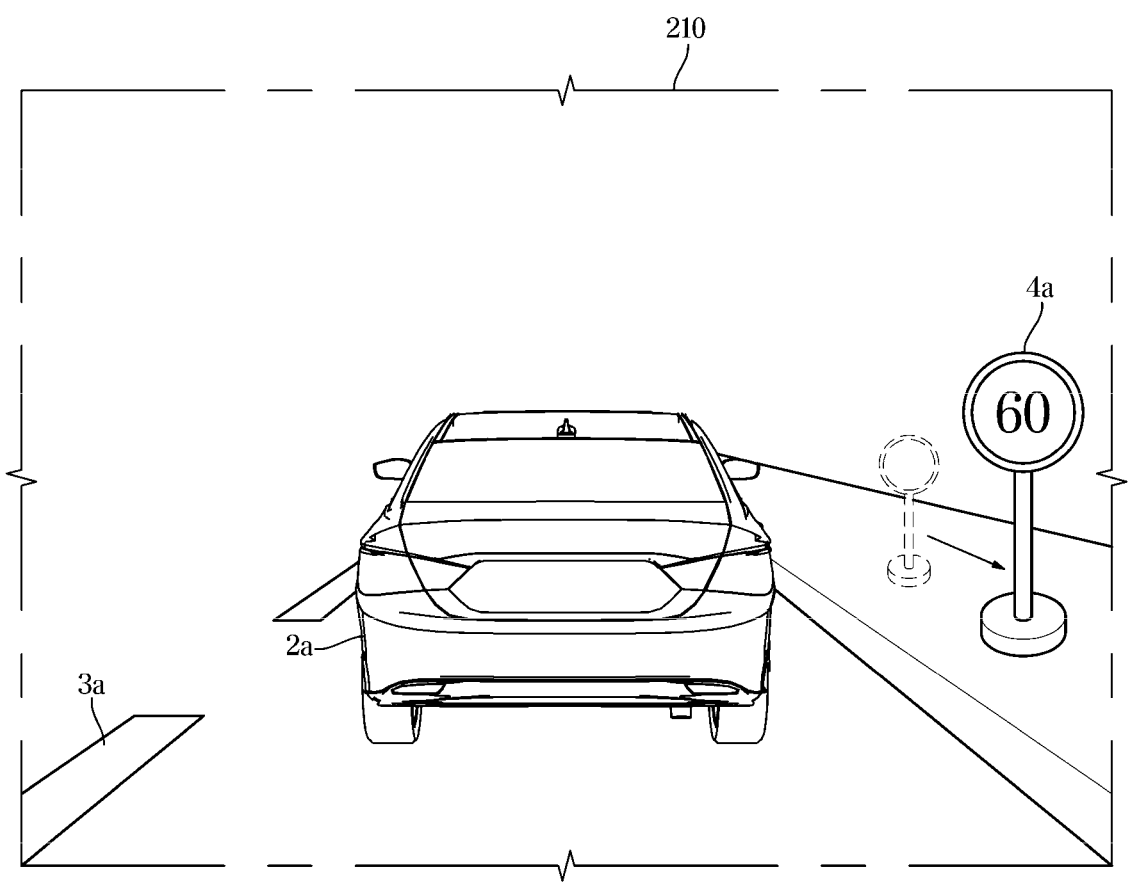
FIG. 8 is a diagram illustrating an image captured by a camera when the vehicle shown in FIG. 7 is driven.
Figure 9:
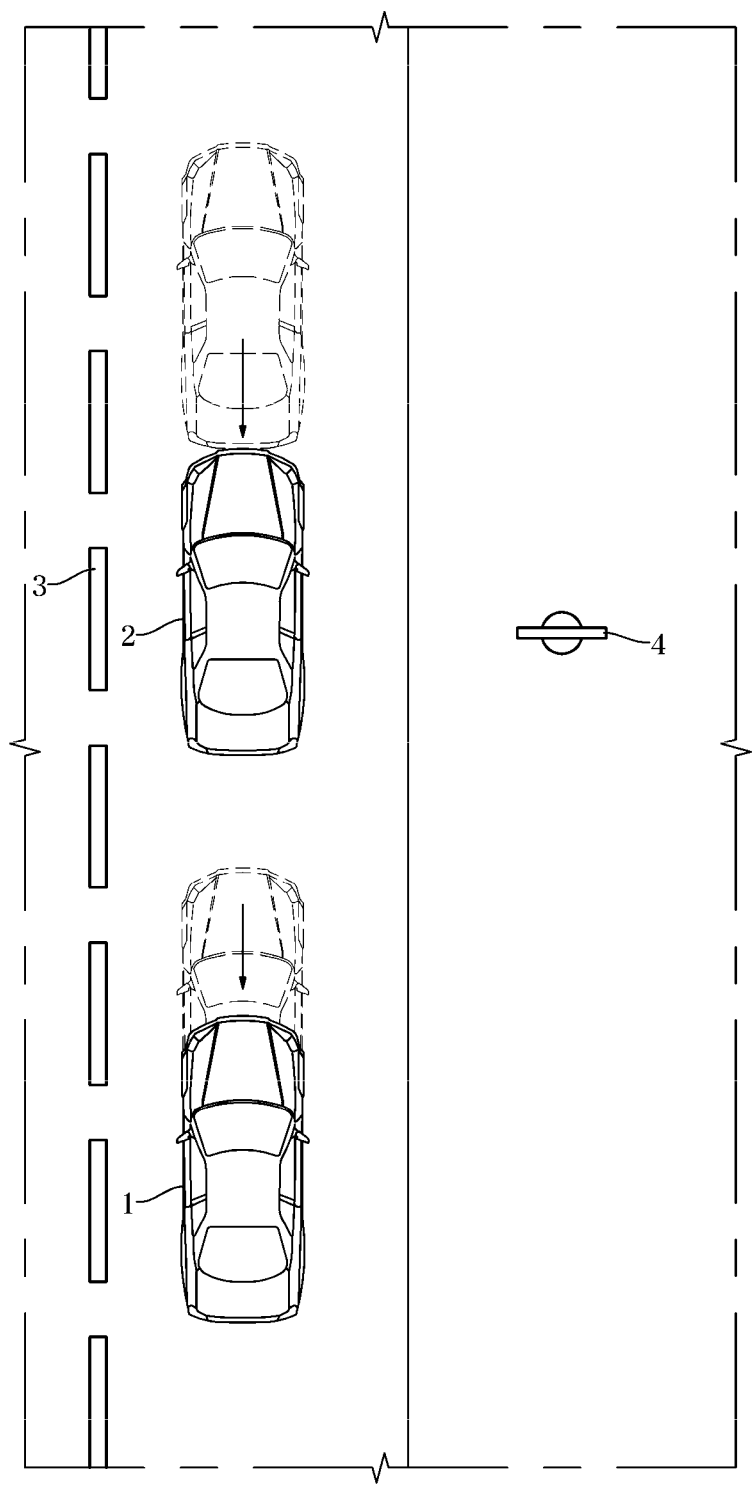
FIG. 9 is a diagram illustrating a vehicle driving backward according to an embodiment.
Figure 10:
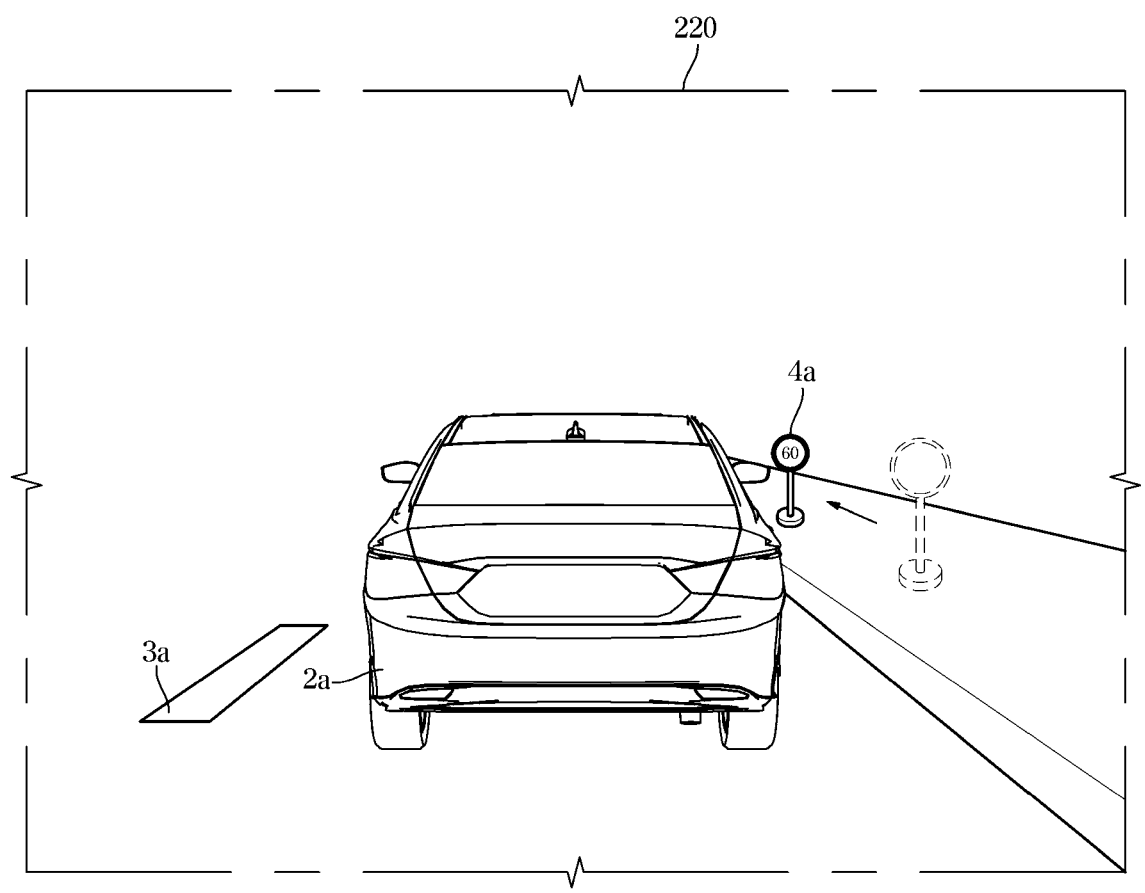
FIG. 10 is a diagram illustrating an image captured by a camera when the vehicle shown in FIG. 9 is driven.

FIG. 6 is a diagram illustrating an emergency braking method of a driver assistance apparatus according to an embodiment. FIG. 7 is a diagram illustrating a vehicle driving forward according to an embodiment. FIG. 8 is a diagram illustrating an image captured by a camera when the vehicle shown in FIG. 7 is driven. FIG. 9 is a diagram illustrating a vehicle driving backward according to an embodiment. FIG. 10 is a diagram illustrating an image captured by a camera when the vehicle shown in FIG. 9 is driven.

Together with FIGS. 6, 7, 8, 9 and 10, the emergency braking method 1100 of the driver assistance apparatus will be described.

The driver assistance apparatus 100 identifies and classifies objects around the vehicle 1 (1110). The driver assistance apparatus 100 identifies the relative position and relative velocity of the surrounding objects of the vehicle 1 (1120).

Operations 1110 and 1120 may be the same as operations 1010 and 1020 shown in FIG. 4.

The driver assistance apparatus 100 selects a target among objects (1130).

The controller 140 may select a target having a risk of collision with the vehicle 1 based on image data acquired by the front camera 110.

For example, the controller 140 may identify a lane marker and another vehicle based on image data of the front camera 110. The controller 140 may identify a preceding vehicle driving in the same lane as the vehicle 1 among another vehicles based on the lane marker and the position of the another vehicle. The controller 140 may identify a lane in which the vehicle 1 drives based on the position of the lane marker, and may identify a preceding vehicle driving in the same lane as the vehicle 1 based on the positions of another vehicles. In addition, the controller 140 may select a preceding vehicle as a target.

As another example, the controller 140 may determine an object (eg, a preceding vehicle, a pedestrian, a bicycle, or an animal) that is expected to collide with the vehicle 1 based on the relative position and relative velocity of the objects. The controller 140 may select an object that is expected to collide with the vehicle 1 as a target.

The driver assistance apparatus 100 determines whether the time until the collision with the target is less than the reference time (1140).

The controller 140 may predict a time to collision (TTC) between the vehicle 1 and the target based on the relative positions and relative velocity of the objects. For example, the controller 140 may calculate the remaining time to collision (TTC) between the vehicle 1 and the preceding vehicle based on the distance to the preceding vehicle and the relative velocity of the preceding vehicle. The controller 140 may also compare the remaining time to collision (TTC) with the target with the reference time, and determine whether the remaining time to collision (TTC) with the target is less than the reference time.

However, operation 1140 may be replaced with an operation dependent on distance.

For example, the controller 140 may predict a distance to collision (DTC) between the vehicle 1 and the target based on the relative positions and relative velocity of the objects. The controller 140 may calculate the distance to collision (DTC) with the target based on the product of the driving speed of the vehicle 1 and the remaining time to collision (TTC) with the target. The controller 140 may also compare the remaining distance to collision (DTC) with the target with the reference time, and determine whether the remaining distance to collision (DTC) with the target is less than the reference distance.

When the time to collision with the target is not less than the reference time (No in 1140), the driver assistance apparatus 100 may re-identify surrounding objects and re-identify the relative positions and relative velocity of the objects. In addition, the driver assistance apparatus 100 may reselect the target and determine whether the time to the collision with the target is less than the reference time.

When the time to the collision with the target is less than the reference time (YES in 1140), the driver assistance apparatus 100 determines whether the vehicle 1 is moving forward or backward (1150).

The controller 140 may determine whether the vehicle 1 is moving forward or backward based on the image data of the front camera 110 as described above with reference to FIG. 4. For example, the controller 140 may determine whether the vehicle 1 is moving forward or backward based on the movement of an image representing a stationary object within an image frame captured by the front camera 110. Specifically, the controller 140 may determine that the vehicle 1 moves forward when the image of the stationary object in the image frame moves from the center of the image frame toward the edge. Further, the controller 140 may determine that the vehicle 1 moves backward when the image of the stationary object in the image frame moves from the edge of the image frame toward the center.

When it is determined that the vehicle 1 is moving forward ("moving forward" in 1150), the driver assistance apparatus 100 performs emergency braking (1160).

When a collision between vehicle 1 and target is expected and vehicle 1 moves forward, it may be determined that the vehicle 1 moves toward a target (eg, a preceding vehicle).

For example, as shown in FIG. 7, the preceding vehicle 2 may be located in front of the vehicle 1. In addition, a lane marker 3 may be located on the left side of the vehicle 1, and a sign 4 may be located on the front right side of the vehicle 1.

In this case, the front camera 110 may capture an image frame 210 as shown in FIG. 8. The image frame 210 may include a preceding vehicle image 2a representing the preceding vehicle 2, a lane marker image 3a representing the lane marker 3, and a sign image 4a representing the sign 4.

When the preceding vehicle 2 stops and the vehicle 1 drives forward, in the image frame 210 captured by the front camera 110, the preceding vehicle image 2a increases, and the remaining time to collision (TTC) between the vehicle 1 and the preceding vehicle 2 may decrease. The controller 140 may predict a collision between the vehicle 1 and the preceding vehicle 2. In addition, as shown in FIG. 8, the lane marker image 3a and/or the sign image 4a in the image frame 210 may move from the center of the image frame 210 toward the edge.

The controller 140 may determine that the vehicle 1 is driving toward the front based on the movement of the lane marker image 3a and/or the sign image 4a. In addition, the controller 140 may determine that a collision between the vehicle 1 and the preceding vehicle 2 is expected because the vehicle 1 advances toward the preceding vehicle 2.

Accordingly, the controller 140 may brake the vehicle 1 in order to avoid a collision between the vehicle 1 and the preceding vehicle 2. For example, based on the remaining time to collision (TTC) between the vehicle 1 and the preceding vehicle 2, the controller 140 prepares for braking and then brakes the vehicle 1 with the first braking force and then may transmit a braking signal to the braking system 30 to brake the vehicle 1 with a second braking force greater than the first braking force.

When it is determined that the vehicle 1 is moving backward ("moving backward" of 1150), the driver assistance apparatus 100 warns of a collision (1170).

When a collision between the vehicle 1 and the target is expected and the vehicle 1 moves backward, it may be determined that the target (eg, a preceding vehicle) moves toward the vehicle 1.

For example, as shown in FIG. 9, the vehicle 1 may drive backward, and the preceding vehicle 2 may also drive backward in front of the vehicle 1. In addition, a lane marker 3 may be located on the left side of the vehicle 1, and a sign 4 may be located on the front right side of the vehicle (1).

In this case, the front camera 110 may capture an image frame 220 as shown in FIG. 10. The image frame 220 may include a preceding vehicle image 2a representing the preceding vehicle 2, a lane marker image 3a representing the lane marker 3, and a sign image 4a representing the sign 4.

When vehicle 1 drives backward and the preceding vehicle 2 drives backward at a faster speed, in the image frame 210 captured by the front camera 110, the preceding vehicle image 2a increases, and the remaining time to collision (TTC) between the vehicle 1 and the preceding vehicle 2 may decrease. The controller 140 may predict a collision between the vehicle 1 and the preceding vehicle 2. In addition, as illustrated in FIG. 10, the lane marker image 3a and/or the sign image 4a in the image frame 220 may move from the edge of the image frame 220 toward the center.

The controller 140 may determine that the vehicle 1 is driving toward the rear based on the movement of the lane marker image 3a and/or the sign image 4a. In addition, the controller 140 may determine that a collision between the vehicle 1 and the preceding vehicle 2 is expected because the preceding vehicle 2 moves backward toward the vehicle 1.

If it is determined that a collision between the vehicle 1 and the preceding vehicle 2 is expected, and thus the vehicle 1 is braked, a collision between the vehicle 1 and the preceding vehicle 2 may be caused.

Accordingly, the controller 140 may provide a warning message to the driver to avoid a collision between the vehicle 1 and the preceding vehicle 2. For example, based on the remaining time to collision (TTC) between vehicle 1 and preceding vehicle 2, the controller 140 may display an image warning message on a display (eg, cluster, AVN, etc.) of the vehicle 1 or may output an acoustic warning message through audio (eg, AVN) of the vehicle 1 or a tactile warning message through a steering wheel of the vehicle 1.

As described above, the driver assistance apparatus 100 may predict a collision with a target (for example, a preceding vehicle), and may identify whether the vehicle 1 is moving forward or backward based on the image data acquired by the front camera 110. In addition, the driver assistance apparatus 100 may urgently brake the vehicle 1 when the vehicle 1 moves forward, and warn of a collision of the vehicle 1 when the vehicle 1 moves backward.

Thereby, a collision with the preceding vehicle 2 may be prevented due to the emergency braking of the vehicle 1 while the vehicle 1 moves backward.

An aspect of the present disclosure is to provide a driver assistance apparatus and a driver assisting method capable of identifying forward movement or backward movement of a vehicle based on image data.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for assisting driving of a host vehicle, the apparatus comprising:
   a camera mounted to the host vehicle and having a field of view outside of the host vehicle, the camera configured to obtain image data; and
   a controller electrically connected to the camera and configured to:
      identify at least one object obstructing the host vehicle's driving based on the image data, the at least one object including a preceding vehicle,
      predict a collision with the preceding vehicle based on the image data,
      identify whether the host vehicle is moving forward or backward based on the image data, and
      when the collision with the preceding vehicle is predicted and the host vehicle is moving forward, outputting, through a vehicle communication network, a brake signal to a braking device of the host vehicle to brake the host vehicle, and
      when the collision with the preceding vehicle is predicted and the host vehicle is moving backward, determining that the preceding vehicle moves toward the host vehicle and then outputting, through the vehicle communication network, at least one of a signal to control a display to display an image warning message of the collision, a signal to control an audio to output an acoustic warning message of the collision and a signal to control a steering wheel of the host vehicle to output a tactile warning of the collision, without outputting the brake signal.

2. The apparatus of claim 1, wherein the controller is configured to:
   identify a stationary object within an image frame by the image data, and
   after determining movement of the stationary object over time based on the image data, identify that the host vehicle is moving forward in response to an increase in a number of pixels occupied by the stationary object within the image frame and that the host vehicle is moving backward in response to a decrease in the number of pixels occupied by the stationary object within the image frame, and
   wherein the controller is configured to identify at least one of a lane marker and a sign within an image frame by the image data and identify whether the host vehicle is moving forward or backward based on the at least one of the lane marker and the sign.

3. A method for assisting driving of a host vehicle, the method comprising:
   obtaining, by a controller of the host vehicle, image data from a camera mounted to the host vehicle, having a field of view outside of the host vehicle and electrically connected to the controller;
   identifying, by the controller, at least one object obstructing the host vehicle's driving based on the image data, the at least one object including a preceding vehicle;
   predicting, by the controller, a collision with the preceding vehicle based on the image data;
   identifying, by the controller, whether the host vehicle is moving forward or backward based on the image data; and
   when the collision with the preceding vehicle is predicted and the host vehicle is moving forward, outputting, through a vehicle communication network, a brake signal to a braking device of the host vehicle to brake the host vehicle,
   when the collision with the preceding vehicle is predicted and the host vehicle is moving backward, determining that the preceding vehicle moves toward the host vehicle and then outputting, through the vehicle communication network, at least one of a signal to control a display to display an image warning message of the collision, a signal to control an audio to output an acoustic warning message of the collision and a signal to control a steering wheel of the host vehicle to output a tactile warning of the collision, without outputting the brake signal.

4. The method of claim 3, further comprises:
   identifying a stationary object within an image frame by the image data, and
   after determining movement of the stationary object over time based on the image data, identifying that the host vehicle is moving forward in response to a number of pixels occupied by the stationary object within the image frame increases and that the host vehicle is moving backward in response to the number of pixels occupied by the stationary object within the image frame decreases, and
   wherein the identifying the stationary object within an image frame by the image data comprises:
   identifying at least one of a lane marker and a sign within an image frame by the image data.

5. The method of claim 3, wherein the predicting the collision with the at least one object comprises:
   obtaining detection data by a sensor installed in the host vehicle, having a detection field of view of at least one of a front and a side of the host vehicle, the sensor comprising at least one of a radar sensor and a lidar sensor; and
   predicting the collision with the at least one object based on the detection data.

6. An apparatus for assisting driving of a host vehicle, the apparatus comprising:

an image sensor mounted to the host vehicle and having a field of view outside of the host vehicle, the image sensor configured to obtain image data;

a radar sensor mounted to the host vehicle and having a detection field of view of at least one of the front and side of the host vehicle, the radar sensor configured to obtain detection data; and a controller electrically connected to the image sensor and the radar sensor configured to:
- identify at least one object obstructing the host vehicle's driving based on the image data, the at least one object including a preceding vehicle,
- predict a collision with the preceding vehicle based on the detection data,
- identify whether the host vehicle is moving forward or backward based on the image data, and
- when the collision with the preceding vehicle is predicted and the host vehicle is moving forward, outputting, through a vehicle communication network, a brake signal to a braking device of the host vehicle to brake the host vehicle, when the collision with the preceding vehicle is predicted and the host vehicle is moving backward, determining that the preceding vehicle moves toward the host vehicle and then outputting, through the vehicle communication network, at least one of a signal to control a display to display an image warning message of the collision, a signal to control an audio to output an acoustic warning message of the collision and a signal to control a steering wheel of the host vehicle to output a tactile warning of the collision, without outputting the brake signal.

7. The apparatus of claim 6, wherein the controller is configured to:
- identify a stationary object within an image frame by the image data, and
- after determining movement of the stationary object over time based on the image data, identify that the host vehicle is moving forward in response to a number of pixels occupied by the stationary object within the image frame increases and that the host vehicle is moving backward in response to the number of pixels occupied by the stationary object within the image frame decreases, and
- wherein the controller is configured to identify at least one of a lane marker and a sign within an image frame by the image data and identify whether the host vehicle is moving forward or backward based on the at least one of the lane marker and the sign.

\* \* \* \* \*